Patented June 14, 1932

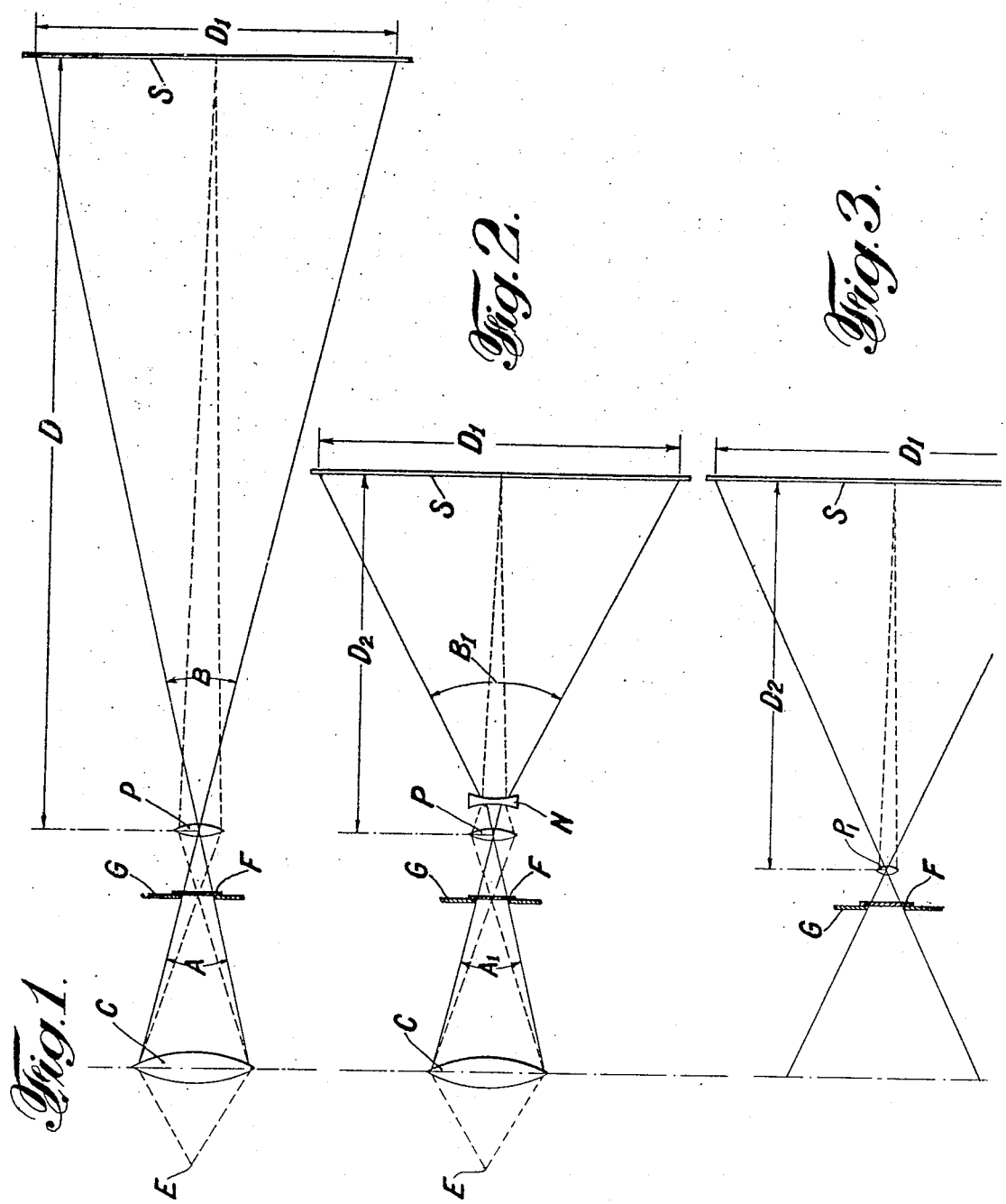

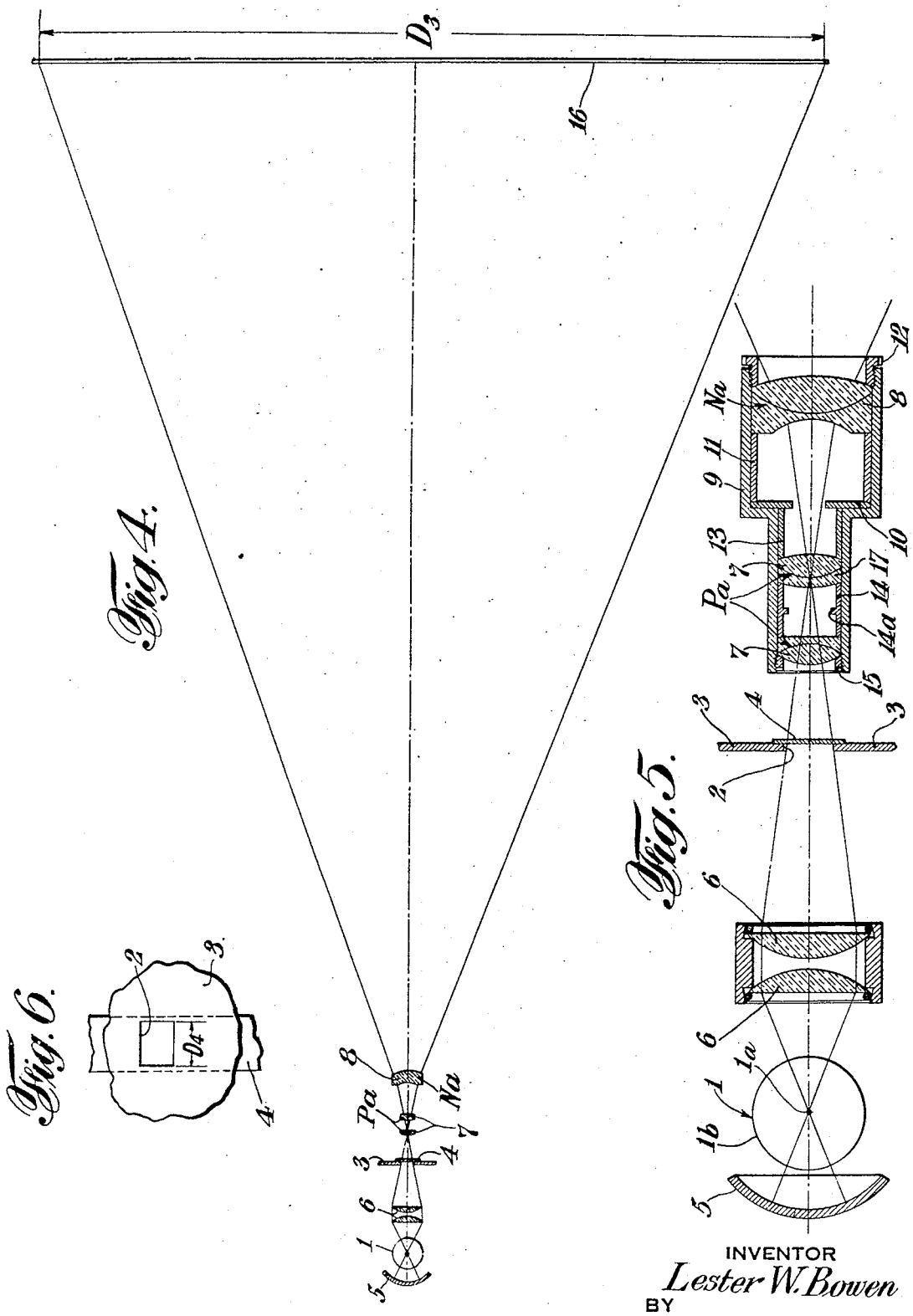

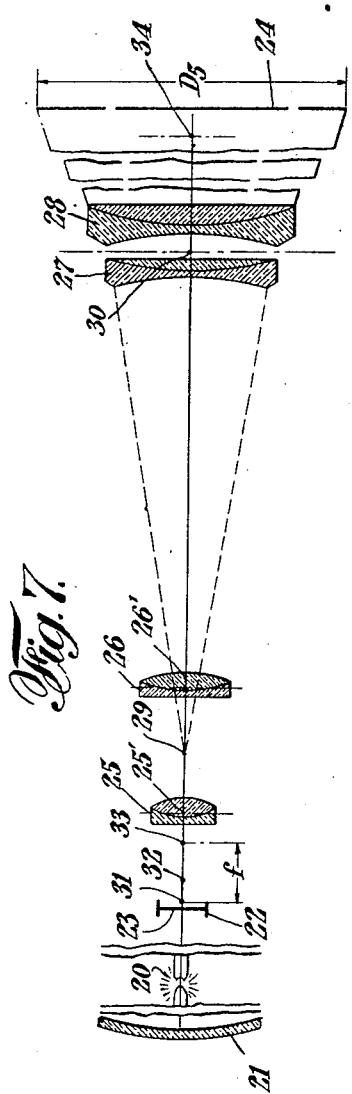
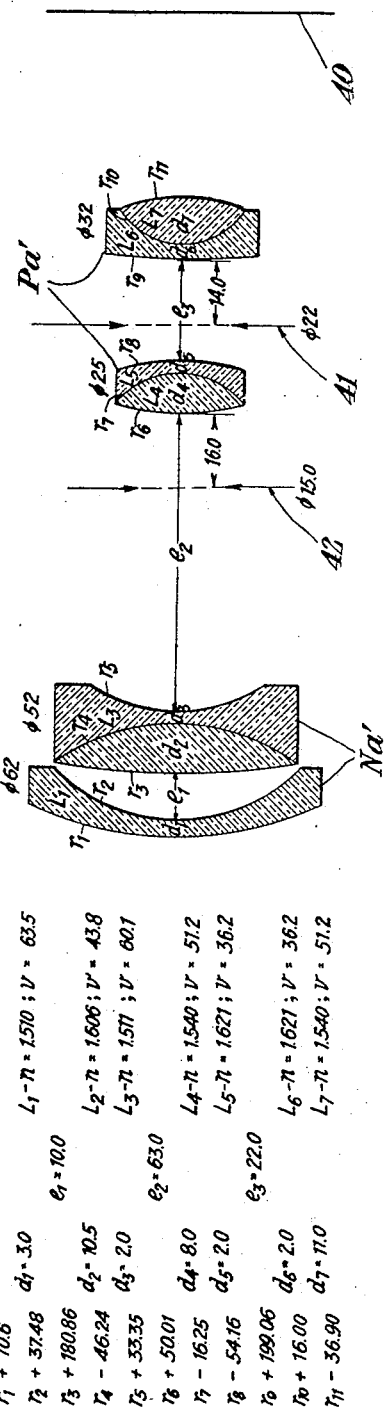

1,863,099

UNITED STATES PATENT OFFICE

LESTER W. BOWEN, OF LARCHMONT, NEW YORK, ASSIGNOR TO TRANS-LUX DAYLIGHT PICTURE SCREEN CORPORATION, OF NEW YORK, N. Y., A CORPORATION OF DELAWARE

PROJECTION SYSTEM AND PROJECTION LENS SYSTEM THEREFOR

Application filed January 15, 1930, Serial No. 420,937, and in Canada and France October 30, 1929.

My invention relates to a projection system wherein the projection apparatus and screen are disposed relatively close to each other, and it is especially useful in effecting satisfactory and efficient rear projection for animated or motion pictures, with ample brightness and size of projected image, for theatrical, "home movie" and other uses with the attained advantages.

My invention, in one of its many important phases, relates to a projection lens system for a projection system, as aforesaid, and which includes lens assemblies of positive and negative character.

My invention, in another of its important phases, relates to a projection lens system including lens assemblies of positive and negative character associated with a condensing lens system of practical and efficient character.

My invention, in another of its important phases, relates to a projection lens system, as aforesaid, wherein the effective aperture of the lens assembly of positive character bears a predetermined relation to the aperture of the gate or frame of the projection apparatus known as the picture aperture.

My invention, in another of its important phases, relates to a projection lens system, as aforesaid, the equivalent focal length of which bears a predetermined relation to the length of the longest side of the aforesaid aperture of the gate or frame.

Further advantages, characteristics and objects of my invention will become apparent from the following description taken in connection with the accompanying drawings.

My invention resides in the projection system, projection lens system, combinations, and features of construction and in the relation of various parts of said systems to each other.

This application is a continuation in part of my pending application Serial No. 316,403, filed November 1, 1928.

For an understanding of my invention, reference is to be had to the accompanying drawings, in which:

Figure 1 is a diagrammatic plan view, not drawn to scale, of a prior art projection system;

Fig. 2 is a diagrammatic plan view, not drawn to scale, of a projection system involving my invention;

Fig. 3 is a diagrammatic plan view, not drawn to scale, of a projection system which for the purposes of my invention, is of an impractical character;

Fig. 4 is a plan view, drawn approximately to scale, of one of many forms of projection systems constructed in accordance with my invention and adapted for the projection of motion pictures, particularly those known to the art as "home motion pictures";

Fig. 5 is an enlarged plan view, drawn approximately to scale, of a part of the system shown in Fig. 4;

Fig. 6 is an intermediate end view of a part of the system of Fig. 5 as viewed from the line 6—6 of said Fig. 5;

Fig. 7 is a plan view of another of the many projection systems constructed in accordance with my invention; and Fig. 8 shows a projection lens system constructed in accordance with my invention.

Figs. 1, 2 and 3 of the accompanying drawings are diagrammatic illustrations of projection systems serving to demonstrate by comparison certain important phases of my invention. It shall be distinctly understood that Figs. 1, 2 and 3 are not drawn to scale.

Fig. 1 diagrammatically illustrates a projection system such as is ordinarily utilized in connection with the projection of motion pictures. As shown, E represents any suitable source of light and C represents any suitable condensing lens system from which the beam of light passes through a gate or frame G defining an aperture with which individual sections of the film F are registrable successively as well understod in the art. P represents any suitable projection lens system disposed as usual between the gate G and the screen S, the distance D between said lens system P and screen S representing the projection distance.

The dotted lines represent the light rays which image a point of the film, which is at the optical axis of the system, to a point at the center of the screen S and these rays are shown as taking in the full aperture of the lens system P. The continuous lines represent the limiting field rays which image points of the respective opposite edges of the film F to points disposed, respectively, at opposite edges of the image area on the screen S. In Fig. 1, the angle A is the convergence angle of the condensing lens system C and the angle B is the field angle of the projecting lens system P, such field angle causing an image area on the screen S of a width D1, the angles A and B being equal to each other.

Referring to Fig. 2, there is illustrated a projection system comprising a source of light E, a condensing lens system C and a gate G, all the same and arranged the same as in Fig. 1. In accordance with my invention and to the end that the screen S may be disposed materially nearer the projection lens system than as shown in Fig. 1, while obtaining an image area on said screen S of the desired extent and illumination, the projection lens system of Fig. 2 is arranged to include a lens P corresponding substantially with the similarly designated lens of Fig. 1 and, in addition, a lens N. The lenses P of Figs. 1 and 2 are of positive character whereas the lens N is of negative character, the resulting lens system or combination having relatively short equivalent focal length.

In Fig. 2, the same as in Fig. 1, the dotted lines represent the light rays which image a point of the film, which is at the optical axis of the system, while the continuous lines represent the limiting field rays. As will be observed, these light rays of Fig. 2 pass from the source of light E, through the condensing lens system C, gate G and lens P the same as in Fig. 1. However, as shown in Fig. 2, the lens N causes wide divergence of the field rays as represented by the angle B1, whereas the convergence angle of the condensing lens system C of Fig. 1 may be measured by the angle A1 which, in the form of my invention illustrated in Fig. 2, is the same as the angle A of Fig. 1. It results, therefore, that the combination of lenses P and N of Fig. 2 causes the angle B1 to be greater than the angle A1 thereby obtaining a relation different from the relation between the corresponding angles B and A of Fig. 1. As a result, for a distance D2 between the lens P and screen S of Fig. 2 which is materially less than the distance D of Fig. 1, the image area on the screen S of Fig. 2 may be of such magnitude as is desired. As illustrated, the image area on the screen S of Fig. 2 is the same as the image area of the screen S of Fig. 1, the image area widths D1 and D1 being equal in the examples of Figs. 1 and 2.

In Fig. 2, the effective area of the aperture of lens P is substantially the same as the effective area of the aperture of the lens P of Fig. 1. As a result, the quantity of light traversing the projection lens system of Fig. 2 is substantially the same as the quantity traversing the projection lens system of Fig. 1 and, therefore, the screen S of Fig. 2 is illuminated to substantially the same degree as is the screen S of Fig. 1.

Accordingly, it follows that one important aspect of my invention involves a projection arrangement which includes a projection lens system comprising lenses of positive and negative character with which is associated a condensing lens system, or equivalent, the divergence field angle of said projection lens system being greater than the convergence angle of said condensing lens system.

In a theoretical but impractical sense, a positive lens alone may be utilized to obtain a screen image area of approximately the extent disclosed in Fig. 2 where the distance between the gate and screen is approximately the same as in said Fig. 2. Thus, as illustrated in Fig. 3, an image area of width D1 is assumed as on the screen S and the latter is spaced a distance D2 from the lens P1 which is shown as disposed between the gate G and the screen S. In Fig. 3, the aperture of gate G is assumed as the same or approximately the same as in Fig. 2 and, therefore, if the screen image area of Fig. 3 is to be the same or approximately the same as in Fig. 2, the focal length of the lens P1 becomes very short. Where the lens P1 is of sufficiently short focal length to produce the result just stated, it follows that the effective aperture thereof is relatively small, as compared, for example, to the effective aperture of the lens P of Figs. 1 or 2 and hence with the arrangement of Fig. 3, there will be deficiency of screen illumination.

As will be obvious from the light lines of Fig. 3, a condensing lens system C of the character, and spaced from the gate G, as illustrated in Figs. 1 and 2 will not be satisfactorily operative when associated in the same relation with the projection system of Fig. 3. If the condensing lens system of Fig. 3 is to be spaced from the gate G the same distance as in Figs. 1 or 2, said condensing lens system must be of substantially greater diameter than in said Figs. 1 or 2. If the condensing lens system of Fig. 3 is to be spaced from the gate G a distance less than in Figs. 1 or 2, the thickness thereof must be proportionately increased in order to secure the necessary convergence of the light rays through the aperture of gate G and the lens P1. In either event, an impractical condensing lens system would be obtained with resultant unsatisfactory operation.

From the foregoing, it becomes evident, therefore, that, in accordance with my invention, the utilization of lens assemblies of positive and negative character to materially decrease the distance between the gate aperture and screen possesses marked utility for projection purposes. This follows because the presence in the lens system or combination of the lens assembly of negative character renders practical the utilization of a relative long focus lens assembly of positive character and having a relatively large effective aperture such, for example, as illustrated in Figs. 1 and 2 in contra-distinction to the relatively short focus lens of positive character and having a relatively small effective aperture as illustrated in Fig. 3.

Although I have shown the combination of a condensing lens system of any suitable character with a projection lens system comprising lens assemblies of positive and negative character, it shall be distinctly understood that my invention is not to be thus limited because, if desirable and suitable, the condensing lens system may be omitted and a reflector or other suitable light-controlling means substituted therefor.

Referring now to Figs. 4 and 5, 1 represents a source of light which may be of any suitable character such, for example, as an arc lamp or, as illustrated, an incandescent lamp, the filament 1a of which is disposed within the usual transparent envelope 1b. The beam of light emanating from the filament 1a passes through an aperture 2 formed in a suitable gate or frame 3 and then, in accordance with one application of my invention, through the section of a motion picture film 4 framed by said aperture 2, the respective sections of said film 4 being moved in succession into alinement with said aperture 2 by mechanism of any suitable character.

Ordinarily although not necessarily, the intensity or strength of the aforesaid light beam may be enhanced or increased by a suitable reflector 5 properly positioned with respect to the source of light 1. Further, if desired, a suitable condensing lens system herein shown as comprising the lenses 6, 6 may be interposed between the source of light 1 and the aperture 2, said condensing lens system causing convergence in a direction from left to right, Figs. 4 and 5, of the light beam traversing the aperture 2.

The arrangement last described is typical, when the projection apparatus includes only a positive lens between the film and screen, of arrangements in ordinary use for projecting motion pictures in theatres and in the home. In projection of this character, as is well understood, the distance between the projection apparatus and the screen is relatively great since, as regards a theatre, the projection apparatus is disposed well to the rear of the house while the screen is well to the front and, as regards the home, the distance between the projection apparatus and screen, ordinarily, is of the order of about twenty feet, more or less.

As hereinbefore stated and in accordance with my invention, the distance between the projection apparatus and the screen is decreased by several times compared to the distance required between the prior art projection apparatus and screen. Despite this, substantially the same image area and brightness of image on the screen is obtained as with said prior art projection apparatus. In other words, by my invention, the projection apparatus may be disposed much closer to the screen than heretofore without materially changing the area or brightness of the screen image.

The foregoing holds true for either theatrical or home projection and is an especially beneficial contribution to the art since, in each case, rear projection (meaning projection onto the rear of the screen) with its attendant advantages becomes practical. Among the great advantages of the invention, due to its rendering rear projection practical are: In both home and theatre projection, it eliminates the projected light beam across the audience; it is easier on the eyes, and in theatres it removes the fire hazard from the interior of the theatre to the stage, while in the home, it enables projection in a much more limited space; further, for home projection, it is highly desirable that the projection apparatus be housed within a cabinet which supports a screen, such an arrangement becoming practical when practicing my invention. In a theatre, the distance between the screen and rear wall is so limited, ordinarily, as to preclude the utilization of the prior art projection apparatus if full screen illumination is to be obtained whereas such distance, ordinarily, is sufficient, in accordance with my invention to permit disposal of the projection apparatus to the rear of the screen while still attaining full screen illumination.

In accordance with my invention as illustrated in Figs. 4 and 5 and to the end that the projection apparatus may be disposed much closer to the screen than heretofore as stated above, the projection lens system of such apparatus comprises, as illustrated, a lens assembly $Pa$ of positive character and a lens assembly $Na$ of negative character, said lens assemblies being disposed in alinement with each other and in the path of the light beam passing through the aperture 2 and film 4.

In the form of my invention shown in Figs. 4 and 5, the lens assembly $Pa$ comprises a pair of doublets 7, 7 disposed in spaced relation while the lens assembly $Na$ comprises a single doublet 8 suitably spaced from the doublets 7, 7, the lens assembly $Pa$ being disposed between the film 4 and the lens assembly $Na$.

As illustrated in Fig. 5, the aforesaid lens assemblies $Pa$ and $Na$ may be disposed within a suitable tube-like housing or casing 9 open at its ends. Further, if desired, the casing 9 may contain a suitable diaphragm 10 held in position by a sleeve 11, in turn, held in position by the lens assembly $Na$ with which coacts an apertured nut 12 threaded into one open end of casing 9. The doublet 7 to the right, Fig. 5, may be held in position between sleeves 13 and 14, the latter, if desired, comprising a laterally extending diaphragm-forming section 14a. The doublet 7 to the left, Fig. 5, may be held against the sleeve 14 by an apertured nut 15 threaded into the other open end of casing 9.

The light beam passing through the aperture 2 and the film 4 traverses the lens assembly Pa and then the lens assembly Na, the latter causing wide divergence of the light beam and the formation on the screen 16 of an image area of a width D3, Fig. 4, the screen 16 being of any suitable character as desired.

To form a screen image area of a width D3 with a projection lens system consisting only of a positive lens assembly and of large enough diameter to transmit sufficient light, it would be necessary to increase by several times the distance between said last named lens system and the screen. Accordingly, by utilizing a projection lens system in accordance with my invention and comprising lens assemblies of positive and negative character, it becomes practical to bring the projection apparatus much closer to the screen, or vice versa, while at the same time obtaining an image on the screen of the desired area and brightness.

I have found that with the present state of mechanical development of lenses, if the equivalent focal length of the lens assemblies Pa and Na, as a combination, is approximately equal to the length of the longest side of the picture aperture 2, one will obtain the desired short distance between projection apparatus and screen for a given size picture on the screen and such picture will be of proper illumination and sharpness; and that to obtain this desired short distance between projection apparatus and screen, the said equivalent focal length of the lens combination should not be substantially greater than the length of the longest side of the picture aperture. In the example shown, the aperture 2 is rectangular and its longest side is its width D4 Fig. 6, and to such a dimension, the equivalent focal length of the lens assemblies Pa and Na is preferably approximately equal when the projection system operates in accordance with the preferred form of my invention.

According to my present information and in accordance with my invention, the distance between the projection apparatus and the screen may be decreased until it is approximately the same as the length of the longest side, height or width, of the image area on the screen. In the example shown in Fig. 4, the width D3 constitutes the length of the longest side of the image area on the screen 16 and, therefore, in accordance with my invention and under the present state of development of lenses, the projection apparatus may be disposed a distance from said screen 16 corresponding approximately with the length of said width D3. Accordingly, by the preferred form of my invention there is attained an approximately 1:1 ratio between the distance from the projection apparatus to the screen, on the one hand, and the length of the longest side of the image area on the screen, on the other hand. Where this approximate 1:1 ratio is changed by materially decreasing the distance factor without corresponding change of the image length factor, it is found that the present mechanical state of the lens art is such that image blur may not be prevented.

It shall be understood, however, that, as regards certain broad aspects of my invention, the equivalent focal length of the positive-negative lens combination may range upwardly to a value no greater than twice the length of the longest side picture aperture while still attaining advantageous characteristics and features of my invention.

In practicing my invention, it is important, in order to obtain the proper degree of illumination on the screen 16, that the positive lens assembly and the condenser lens assembly, when the latter is used, should be such as to gather substantially all of the light rays available through the picture aperture and transmit the same in a useful beam to the negative lens assembly. Still further effective area of the positive lens assembly Pa, when used either with or without the condenser lens assembly, should be sufficiently great to pass substantially all of the light traversing the aperture 2 and the section of film 4 defined thereby. To most readily accomplish this, the effective diameter of said positive lens assembly Pa should preferably be at least approximately as large as the longest side of the aperture 2 which, in the example shown and as stated, is its width D4; more particularly, said effective diameter of said lens assembly Pa and said longest side of the aperture 2 should be approximately the same.

As hereinbefore stated, with one form of my invention the equivalent focal length of the lens assemblies Pa and Na is preferably approximately equal to the length of the longest side of the picture aperture and, as stated immediately above, the effective diameter of the positive lens assembly Pa may be equal to the length of the longest side of the picture aperture. From this it follows that in one preferred form of my invention, the equivalent focal length of the projection lens system, i. e., the positive and negative assemblies Pa and Na as a combination, is approximately equal to the effective diameter of the positive lens assembly Pa and the equivalent focal length of said lens assemblies should not exceed approximately the effective diameter of the positive lens assembly Pa.

With some forms of my invention, the effective diameter of the positive lens assembly Pa may be less than the length of the longest side of the aperture. Such a relation results, ordinarily, due to the relation between the parts and due to the association with the projection lens system of a suitable condenser lens system so positioned that the light beam after traversing the aperture converges to an area less than that of said aperture. In any event, however, it is desirable, for the sake of high efficiency, that the positive lens assembly pass substantially all of the light traversing the aperture.

Obviously, substantially all of the light traversing the positive assembly Pa should likewise traverse the negative assembly Na when a screen image of maximum area is desired. This result may be assured by providing the lens assembly Na with an effective aperture which is somewhat greater than the effective aperture of the lens assembly Pa, Fig. 5.

The focal lengths of the various doublets and of the lens assemblies formed thereby may be such as is suitable or desirable to one skilled in the art. For a specified distance between the projection apparatus and the screen 16 and for specified dimensions of the aperture 2, many combinations or arrangements of lenses may be chosen. In general, the equivalent focal length of the projection lens system combination will be relatively small, and, as stated, where the aforesaid approximately 1:1 ratio obtains, said equivalent focal length is approximately equal to the length of the longest side of the aperture 2 or to the effective diameter of the positive lens assembly Pa.

The various lenses and/or doublets forming the projection lens system may be spaced from each other in a manner suitable to one skilled in the art and this is true particularly of the spacing of the positive and negative lens assemblies with respect to each other provided that the distance between such assemblies is greater than the focal length of the positive assembly.

For a specified distance between the projection apparatus and the screen 16, the position therebetween of the projection lens system is so selected that the screen image is sharply focused with clear definition.

As stated, Fig. 4 is a plan view, drawn approximately to scale, of a projection system adapted for the projection of "home motion pictures". With such an arrangement, the width D3 of the image area on the screen 16 is approximately twenty-eight inches whereas the height of said image area is approximately twenty-one inches. The distance between the projection apparatus (negative lens assembly thereof) and the screen to produce an image area of such dimensions is approximately thirty-four inches. Thus, in accordance with one form of my invention, the ratio between the distance from the projection apparatus to the screen, on the one hand, and the length of the longest side of the image area, on the other hand, instead of being exactly 1:1 is approximately 34:28.

With a projection system of the prior art where the projection lens system includes only a positive lens, the distance between the projection lens apparatus (positive lens thereof) and the screen is approximately one hundred and sixty-two inches when an image area of the aforesaid dimensions, namely, width of twenty-eight inches and height of twenty-one inches is obtained if the light intensity is to be about the same in both cases. Of course, by utilizing prior art projection lens systems having positive lenses of different focal lengths, the distance between the projection apparatus and the screen may be varied from that just stated. Accordingly, by my invention, the negative lens assembly decreases by several times the distance between the screen and the projection lens system compared to the distance required between said screen and a projection lens system of positive character only, when, in each case, image areas of the same extent and the same degree of illumination are obtained.

It shall be distinctly understood that the dimensions and other data thus specifically stated are intended as descriptive of one of the many forms of my invention and not as limitive thereof.

In the foregoing description in connection with Fig. 2, I have generally described my invention. In connection with Figs. 4, 5 and 6, I have more specifically described one form of my invention. I will now proceed in connection with Fig. 7 to describe another form of my invention and to specify certain data in connection therewith, it being distinctly understood, however, that my invention is not to be limited to an arrangement such as shown in Fig. 7 nor to the following description concerning the same.

As shown in Fig. 7, a suitable source of light 20 may have a suitable reflector 21 associated therewith, light from the source 20 and reflector 21 passing first through any suitable system of condensing lenses, when utilized, and then through an aperture 22 with respect to which a film 23 may be moved in any suitable manner.

The light, after passing through the aperture 22 and film 23, proceeds through the various projection lenses of the system and impinges upon a picture-receiving screen 24 of suitable character. As hereinbefore described, the projection lens system may consist of a rear or positive assembly and a front or negative assembly, the positive assembly being disposed between the aperture 22 and the negative assembly. As stated above, the general purpose of the positive assembly is to intercept light rays passing through the aperture 22 and to converge such light rays, the same being subsequently intercepted by the negative assembly from which they pass as a widely divergent beam.

In the form of my invention shown in Fig. 7, the positive assembly consists of two positive lens combinations 25 and 26 and the negative assembly consists of two negative lens combinations 27 and 28, each combination, as illustrated, comprising separate lenses combined to form doublets, the lenses of each doublet being cemented together or spaced by an air gap as desired.

As illustrated in Fig. 7, the focal length of the positive lens combination 26 is twice the focal length of the positive lens combination 25 and these combinations may be so spaced that the distance between their nodal points 25' and 26' is approximately equal to the focal length of the positive lens combination 25.

In the example illustrated in Fig. 7, the focal lengths of the negative lens combinations 27 and 28 are equal and these combinations should be so spaced that substantially all of the light passing through the combination 27 also enters and passes through the combination 28. This result may be assured, for example, by providing the combination 28 with an effective aperture which is somewhat greater than the effective aperture of the combination 27.

The positive and negative assemblies may be disposed in such spaced relation as is suitable to one skilled in the art provided that the distance between such assemblies is greater than the focal length of the positive assembly. Usually, the positive assembly comprises one or more spaced plural lens arrangements, and the same may be true of the negative assembly. In this specification and in the appended claims, where I specify that the positive lens assembly and the negative lens assembly are spaced one from the other a distance greater than the focal length of the positive lens assembly, I mean the following: The equivalent focal length of the positive assembly, i. e. of the one or more spaced plural lens arrangements forming the positive assembly, is computed in a manner understood in the art; and then, in the direction taken by the light while passing from the light source to the screen, the nodal point of exit of the positive assembly and the nodal point of entrance of the negative assembly are spaced apart a distance greater than the equivalent focal length of the positive assembly as thus computed.

As also illustrated in Fig. 7, the separation between the optical center 29 of the positive assembly and the optical center 30 of the negative assembly is greater than the focal length of the positive assembly, for example, three or four times greater.

The primary focal point of the projection lens system of Fig. 7 is indicated at 31, such focal point being at the rear of the primary focal point 32 of said positive assembly. The distance between these primary focal points 31 and 32 depends upon the relation existing between the focal lengths of the positive and negative assemblies and also upon the separation between such assemblies. The nodal point of entrance 33 of said projection lens system falls at the rear of the positive assembly and is between the primary focal point 32 and the positive lens combination 25. The equivalent focal length $f$ of said projection lens system, therefore, is the distance between the equivalent focal point 31 and the nodal point 33 and, in the form of my invention shown in Fig. 7, the lens assemblies are so related that said equivalent focal length $f$ is less than the back focus of the projection lens system and as shown in Fig. 7 it is approximately equal to the longest side, or width, of the film aperture 22.

In Fig. 7, the positive assembly comprising the lens combinations 25 and 26 has a focal length of plus 3 inches and the negative assembly comprising the lens combinations 27 and 28 has a focal length of minus 6 inches, the two assemblies being so spaced that the separation between the nodal points is about 10 inches. Accordingly, the equivalent focal length of the projection lens system of Fig. 7 is approximately 1⅜ inches.

In operation, the light passing through the film 23 is intercepted and redirected by the positive assembly and, if the negative assembly were not employed, the light would be converged to a focus or image at a pont 34. However, the light rays passing through the positive assembly are intercepted by the negative assembly and are caused to diverge to such an extent that they focus a much larger projected picture or real image of a width D5 on the screen 24.

Having described the general relationships that may preferably exist between the various elements of this lens system, these relationships being clearly illustrated in Fig. 7 of the drawings, reference is now made to Fig. 8 of the drawings, which shows another lens system embodying the present invention and the dimensions and constants of the system, and of the individual lenses that enter into the system. In this figure, 40 represents the location of the projector aperture or gate, 41 represents a diaphragm disposed between the two doublets of the positive assembly $Pa'$, and 42 represents a diaphragm disposed between the positive and the negative assemblies $Na'$ of the system. The curvatures $(r)$, thicknesses $(d)$, spacings $(e)$, indices of refraction for the "D" spectral line $(n)$, dispersions (v), and the diameters (φ) of the various lenses (L) as well as of the diaphragms appear on the drawings. The linear dimensions are given in millimeters. In the particular lens shown in Fig. 8 the focal length of the negative assembly is approximately minus 60 millimeters and of the positive assembly, approximately plus 42 millimeters; while the equivalent focal length of the entire lens system shown is approximately 25.5 millimeters. The separation of the nodal points of the positive and negative assemblies is approximately 80 millimeters. This particular lens system is suitable for the projection of a picture, of say 18 feet in width on the screen, from a distance of approximately 18 feet to the rear of the screen when the picture aperture is 25.5 mm. wide.

Commercially available lenses for motion picture or other projection are subject to various aberrations and inaccuracies, and such lenses should so far as possible be corrected for chromatic aberration, distortion, flatness of field, coma, astigmatism, etc. In the present system, it is possible to apply such corrections in various ways, but I have discovered that by far better definition of the projected images is obtained if both the positive and the negative lens assemblies are corrected one with respect to the other, such for example as hereinafter described, so as to constitute what might be termed a permanent fully corrected lens system. The thus corrected system may be termed a "permanent" one because when the positive and negative assemblies have been corrected one with respect to the other then one is dependent upon the other for the projection of a fully corrected image. In other words, the assemblies are each specially made to be interdependent one upon the other. If the positive assembly is under- or over-corrected for color, the negative assembly should be correspondingly over- or under-corrected for color. If the positive assembly is not fully corrected for flatness of field, the negative assembly should be so designed that its curvature of field is such as to compensate for such deficiency in the positive assembly. If the positive assembly alone causes distortion, it is necessary that the negative assembly produce an opposite distortion.

Fig. 8 is a detailed specification of a preferred form of this invention. With the rays traced through the negative and positive lens systems to the focal plane (plane of the film) it will be found that this plane is well corrected for all aberrations. The negative assembly and positive assembly are individually well corrected for central and oblique color and for coma. The over-corrected astigmatism, curvature of field, distortion and spherical aberration of the negative assembly are compensated by the under-correction of the positive assembly for these aberrations.

It is found that in order to obtain a projection lens system having desired properties and qualities and in order to obtain such a lens system which will give the best results, it is preferred that certain relations should exist between the focal lengths of the positive and negative assemblies, between the separation of these assemblies and their focal lengths, and between the back focus of the system and its equivalent focal length. The focal lengths of the positive and negative assemblies are greater than the equivalent focal length of the system. The separation between the nodal points of the positive and negative assemblies is greater than the equivalent focal length of the positive assembly of the system. The back focus or the distance between the focal plane of the system and the nearest lens surface, although relatively short, preferably, should be greater than the equivalent focal length of the system. The back focus of the system is preferably greater than the length of the longest side of the picture aperture or gate.

In connection with Fig. 2, it has been shown that my invention involves a projection lens system consisting of spaced, single lenses of positive and negative character and disposed in suitable spaced relation. Under some circumstances, such utilization of a projection lens system consisting of a single positive and a single negative lens gives satisfactory results but it is usually desirable, in order to obtain satisfactory image definition, that a positive assembly and a negative assembly be utilized, for example, as described in connection with Figs. 4, 5, 7 and 8. In this specification and in the appended claims, therefore, the term "assembly" qualified by either of the words "positive" or "negative", as the case may be, shall be understood as generically comprehending a single lens, as the lenses P or N, Fig. 2; a single doublet, as the doublet Na, Figs. 4 and 5, or other plural lens arrangement; a plurality of doublets, as the doublets 25 and 26, Fig. 7, or a plurality of other plural lens arrangements; a plurality of single lenses; or a combination consisting of a single lens and a doublet or other plural lens arrangement. It shall also be understood that the term "assemblies" shall have a corresponding meaning. Also, the expression "negative lens assembly" shall be understood as meaning an assembly, as defined above, which considered alone has a negative focal length. Still further, with respect to the appended claims, it shall be understood that the positive and negative lens assemblies are spaced from each other in the manner heretofore described.

In the preceding part of this specification, I have referred to the use of a condensing lens system in association with the positive-negative projection lens combination, and have stated that, if desired, the condensing lens system might be omitted. If so, it will probably be desirable to substitute for said condensing lens system a suitable reflector arrangement which is positioned behind the source of light. Or, both the reflector arrangement and the condensing lens system may be used at the same time. In any event, as regards some of the claims of this application, it is to be understood that the expression "convergence angle of the condensing system" refers to the convergence angle of a condensing lens system, a reflector arrangement, or both and, further, it is to be understood that the expression "condensing system" or "condensing lens system" generically comprehend a condensing lens system, a reflector arrangement, or equivalent, or a desired combination of such a lens system and reflector arrangement.

Usually the gate or frame which forms the "picture aperture" as designated in the appended claims is square or rectangular, Fig. 6. It shall be understood, however, that such aperture may be of any other suitable configuration. Thus, should such gate or aperture be circular, the length of the longest side thereof, in effect, would correspond with its diameter and the appended claims should be read in view of this interpretation.

Although my invention has been described in connection with motion picture film for obtaining the screen images, it shall be understood that these images may be obtained in various other ways. Thus, for example, "ticker" tape, or the like may be utilized and the same is true of representation-bearing slides of any suitable character. The film, tape, slides or the like may be moved with respect to the projection gate or aperture continuously or intermittently as desired, and in any suitable manner or by any suitable mechanism.

In this specification and in the appended claims, when reference is made to the distance between the screen and the projection system, it is to be understood as being computed from one face of the screen to the nodal point of exit of said projection lens system.

Under some circumstances, particularly when projecting motion pictures, the picture aperture of the projector may be omitted. If this is done, the expression "picture aperture" in the appended claims shall be understood as comprehending or meaning a picture frame on the motion picture film.

It shall also be understood that my invention is not to be limited to transparent or translucent projection since, under some circumstances, opaque or reflecting projection may be employed with a projection lens system having the novel focal length range defined in many of the appended claims, in which case the "picture aperture" defines that section of the illuminated object which is in the field of said projection lens system.

Also where the screen images of the animated or motion pictures are obtained or produced by television, it will be understood that the term "motion picture aperture" or "picture aperture" as herein described and used in the claims shall be taken to mean the effective illuminated field to be projected.

While the invention has been described with respect to certain particular examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a rear projection system for motion pictures, the combination of a motion picture aperture and a wide angle lens projection system comprising a positive lens assembly and a negative lens assembly spaced one from the other a distance greater than the focal length of the positive lens assembly and with the latter positioned nearer the picture aperture, said lens system having an equivalent focal length approximately equal to the length of the longest side of the picture aperture.

2. A wide angle lens projection system adapted to be used with a motion picture aperture and comprising a positive lens assembly and a negative lens assembly spaced one from the other a distance greater than the focal length of the positive lens assembly and with the latter adapted to be nearer the picture aperture, said lens system having an equivalent focal length not substantially greater than the length of the longest side of the picture aperture.

3. A wide angle lens projection system adapted to be used with a motion picture aperture and comprising a positive lens assembly and a negative lens assembly spaced one from the other a distance greater than the focal length of the positive lens assembly and with the latter nearer the picture aperture, said lens system having an equivalent focal length approximately equal to the effective diameter of said positive lens assembly.

4. In a rear projection system for motion pictures, the combination of a motion picture aperture, and a wide angle lens projection system comprising a positive lens assembly and a negative lens assembly spaced one from the other a distance greater than the focal length of the positive lens assembly and with the latter positioned nearer the picture aperture, said lens system having an equivalent focal length approximately equal to the effective diameter of said positive lens assembly, said equivalent focal length being substantially less than the focal length of the positive lens assembly.

5. In a rear projection system for motion pictures, the combination of a motion picture aperture, and a wide angle lens projection system having a permanent lens assembly comprising a positive lens assembly and a negative lens assembly wherein the negative and positive lens assemblies have been corrected one with respect to the other and spaced apart a distance greater than the focal length of the positive lens assembly and with the latter positioned nearer the picture aperture, the effective diameter of said positive lens assembly being not substantially less than the equivalent focal length of said lens system, and said lens system having a covering power not substantially less than its equivalent focal length.

6. A wide angle lens projection system adapted to be used with a motion picture aperture and comprising a positive lens assembly and a negative lens assembly spaced one from the other a distance greater than the focal length of the positive lens assembly and with the latter adapted to be nearer the picture aperture, said lens system having an equivalent focal length approximately equal to the length of the longest side of the picture aperture, the effective diameter of said positive lens assembly being also approximately equal to the length of said longest side of the picture aperture.

7. A wide angle lens projection system adapted to be used with a motion picture aperture and comprising a positive lens assembly and a negative lens assembly spaced one from the other a distance greater than the focal length of the positive lens assembly and with the latter adapted to be nearer the picture aperture, said lens system having a covering power not substantially less than its equivalent focal length.

8. A wide angle lens projection system adapted to be used with a motion picture aperture and comprising a positive lens assembly and a negative lens assembly spaced one from the other a distance greater than the focal length of the positive lens assembly and with the latter adapted to be nearer the picture aperture, the effective diameter of said positive lens assembly being not substantially less than the length of the longest side of the picture aperture, said lens system having an equivalent focal length no greater than twice the length of the longest side of the picture aperture.

9. In a rear projection system for motion pictures, the combination of a motion picture aperture, and a wide angle lens projection system comprising a positive lens assembly and a negative lens assembly spaced one from the other a distance greater than the focal length of the positive lens assembly and with the latter positioned nearer the picture aper-
of light which passes through said aperture lens assembly being not substantially less then the equivalent focal length of the lens system, and said lens system having an equivalent focal length no greater than twice the length of the longest side of the picture aperture.

10. In a rear projection system for motion pictures, the combination of a motion picture aperture and a wide angle lens projection system having a permanent lens assembly comprising a positive lens assembly and a negative lens assembly wherein the negative and positive lens assemblies have been corrected one with respect to the other and spaced apart a distance greater than the focal length of the positive lens assembly and with the latter positioned nearer the picture aperture, said lens system having an equivalent focal length not substantially greater than one half the focal length of the positive lens assembly.

11. In a rear projection system for motion pictures, the combination of a motion picture aperture, and a wide angle lens projection system comprising a positive lens assembly and a negative lens assembly spaced one from the other a distance greater than the focal length of the positive lens assembly and with the latter positioned nearer the picture aperture, the effective diameter of said positive lens assembly being not substantially less than the equivalent focal length of the lens system, and said lens system having an equivalent focal length not substantially greater than the length of the longest side of the picture aperture.

12. In a rear projection system for motion pictures, the combination of a motion picture aperture, and a wide angle lens projection system having a permanent lens assembly comprising a positive lens assembly and a negative lens assembly wherein the negative and positive lens assemblies have been corrected one with respect to the other and spaced apart a distance greater than the focal length of the positive lens assembly and with the latter positioned nearer the picture aperture, the effective diameter of said positive lens assembly being not substantially less than the equivalent focal length of the lens system, said lens system having an equivalent focal length not substantially greater than the length of the longest side of the picture aperture.

13. In a rear projection system for motion pictures, the combination of a motion picture aperture and a wide angle lens projection system comprising a positive lens assembly and a negative lens assembly spaced one from the other a distance greater than the focal length of the positive lens assembly and with the latter positioned nearer the picture aperture, said lens system having an equivalent focal length approximately equal to the effective diameter of said positive lens assembly and also approximately equal to the length of the longest side of the picture aperture.

14. In a rear projection system for motion pictures, the combination of a motion picture aperature, and a wide angle lens projection system having a permanent lens assembly comprising a positive lens assembly and a negative lens assembly wherein the negative and positive lens assemblies have been corrected one with respect to the other and spaced apart a distance greater than the focal length of the positive lens assembly and with the latter positioned nearer the picture aperture, said lens system having an equivalent focal length approximately equal to the length of the longest side of the picture aperture, the effective diameter of said positive lens assembly being also approximately equal to the length of said longest side of the picture aperture.

15. In a rear projection system for motion pictures, the combination of a motion picture aperture, a screen, and a wide angle lens projection system having a permanent lens assembly comprising a positive lens assembly and a negative lens assembly wherein the negative and positive lens assembly have been corrected one with respect to the other and spaced apart a distance greater than the focal length of the positive lens assembly and with the latter positioned nearer the picture aperture, the effective diameter of said positive lens assembly being not substantially less than the equivalent focal length of the lens system, said lens system having an equivalent focal length of such short length that the ratio of the distance between said lens system and the screen to the length of the longest side of the screen image area is not substantially greater than 1:1.

16. In a rear projection system for motion pictures, the combination of a screen, a motion picture aperture, a source of light, a condensing system for converging the beam of light which passes through said aperture from said source, and a wide angle lens projection system comprising a positive lens assembly and a negative lens assembly spaced one from the other a distance greater that the focal length of the positive lens assembly and with the latter positioned nearer the picture aperture, said lens system having an epuivalent focal length of such short length that the ratio of the distance between said lens system and the screen to the length of the longest side of the screen image area is less than 2:1, the divergence field angle of said lens system exceeding the convergence angle of said condensing system.

17. In a rear projection system for motion pictures, the combination of a screen, a motion picture aperture, a source of light, a condensing system for converging the beam of light which passes through said aperture from said source, and a corrected wide angle lens projection system comprising a positive lens assembly and a negative lens assembly spaced one from the other a distance greater that the focal length of the positive lens assembly and with the latter positioned nearer the picture aperture, said lens system having an equivalent focal length of such short length that the ratio of the distance between said lens system and the screen to the length of the longest side of the screen image area is approximately 1:1 or less, the divergence field angle of said lens system exceding the convergence angle of said condensing system.

18. In a rear projection system for motion pictures, the combination of a screen, a motion picture aperture, a source of light, a condensing system for converging the beam of light which passes through said aperture from said source, and a wide angle lens projection system comprising a positive lens assembly and a negative lens assembly spaced one from the other a distance greater than the focal length of the positive lens assembly and with the latter positioned nearer the picture aperture, said lens system having an equivalent focal length of such short length that the ratio of the distance between said lens system and the screen to the length of the longest side of the screen image area is less than 2:1, the divergence field angle of said lens system exceeding the convergence angle of said condensing system, the positive lens assembly being corrected in one sense for distortion and spherical aberrations and the negative lens assembly being corrected in an opposite sense for distortion and spherical aberrations, said lens system forming a corrected combination of relatively short equivalent focal length whereby proper image definition is obtained on said screen.

19. A wide angle lens system adapted to be used with a picture aperture and comprising a positive lens assembly and a negative lens assembly spaced one from the other a distance greater than the focal length of the positive lens assembly and with the latter adapted to be nearer the picture aperture, said lens system having an equivalent focal length no greater than twice the length of the longest side of the picture aperture, the positive lens assembly being corrected in one sense for an aberration and the negative lens assembly being corrected in an opposite sense for said aberration, said lens system forming a corrected combination of relatively short equivalent focal length.

20. A wide angle lens system adapted to be used with a picture aperture and comprising a positive lens assembly and a negative lens assembly spaced one from the other a distance greater than the focal length of the positive lens assembly and with the latter adapted to be nearer the picture aperture, said lens system having an equivalent focal length no greater than twice the length of the longest side of the picture aperture, the negative lens assembly comprising different positive and negative elements separated by an air gap.

21. A wide angle lens system adapted to be used with a picture aperture and comprising a positive lens assembly and a negative lens assembly spaced one from the other a distance greater than the focal length of the positive lens assembly and with the latter adapted to be nearer the picture aperture, said lens system having an equivalent focal length no greater than twice the length of the longest side of the picture aperture, the negative lens assembly comprising a plurality of lens arrangements having negative power.

22. A wide angle lens system adapted to be used with a picture aperture and comprising a positive lens assembly and a negative lens assembly spaced one from the other a distance greater than the focal length of the positive lens assembly and with the latter adapted to be nearer the picture aperture, said lens system having an equivalent focal length no greater than twice the length of the longest side of the picture aperture, the positive lens assembly being corrected in one sense for an aberration and the negative lens assembly being corrected in an opposite sense for said aberration, said lens system forming a corrected combination of relatively short equivalent focal length, the positive lens assembly comprising a plurality of plural lens arrangements separated by an air gap and the negative lens assembly comprising at least one plural lens arrangement.

23. A wide angle lens system adapted to be used with a picture aperture, said lens system comprising a permanent lens assembly having a positive lens assembly and a negative lens assembly spaced one from the other a distance greater than the focal length of the positive lens assembly and with the latter adapted to be nearer the picture aperture, said lens system having an equivalent focal length approximately equal to the length of the longest side of the picture aperture, the positive lens assembly being corrected in one sense for an aberration and the negative lens assembly being corrected in an opposite sense for said aberration, said lens system forming a corrected combination of relatively short equivalent focal length, the positive lens assembly comprising a plurality of plural lens arrangements separated by an air gap and the negative lens assembly comprising associated positive and negative elements.

24. A wide angle lens system adapted to be used with a picture aperture and comprising a positive lens assembly and a negative lens assembly spaced one from the other a distance greater than the focal length of the positive lens assembly and with the latter adapted to be nearer the picture aperture, said lens system having an equivalent focal length no greater than twice the length of the longest side of the picture aperture, the positive lens assembly being corrected in one sense for one aberration and the negative lens assembly being corrected in an opposite sense for said aberration, said lens assemblies being individually corrected for other aberrations, said lens system forming a corrected combination of relatively short equivalent focal length.

In testimony whereof I have signed my name to this specification.

LESTER W. BOWEN.

CERTIFICATE OF CORRECTION.

Patent No. 1,863,099. June 14, 1932.

LESTER W. BOWEN.

It is hereby certified that error appears in the printed specification of the above numbered patent requiring correction as follows: Page 1, line 90, for the misspelled word "understod" read understood; page 4, line 35, for "quivalent" road equivalent; line 88, before "picture" insert the words of the; and line 99, after "further" insert the word the; page 6, line 98, for "the" read their; and line 106, for "pont" read point; page 9, line 66, claim 9, strike out the words "of light which passes through said aperture" and insert instead the syllable and words ture, the effective diameter of said positive; and line 67, for "then" read than; page 10, line 6, claim 14, for "aperature" read aperture; line 28, claim 15, for "assembly" read assemblies; line 52, claim 16, for "that" read than; line 55, for "epuivalent" read equivalent; and lines 79 and 80, claim 17, for "exceding" read exceeding; and that the said Letters Patent should be read with these corrections therein that the same may conform to the record of the case in the Patent Office.

Signed and sealed this 1st day of November, A. D. 1932.

(Seal)

M. J. Moore,
Acting Commissioner of Patents.